United States Patent
Fujiwaki et al.

(10) Patent No.: US 9,157,344 B2
(45) Date of Patent: Oct. 13, 2015

(54) SOLENOID VALVE AND VALVE OPENING-CLOSING TIMING CONTROL DEVICE

(75) Inventors: Kenji Fujiwaki, Kariya (JP); Masaki Kobayashi, Okazaki (JP); Makoto Yoshida, Kariya (JP); Kenji Ikeda, Nagoya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 14/239,654

(22) PCT Filed: Jun. 18, 2012

(86) PCT No.: PCT/JP2012/065519
§ 371 (c)(1),
(2), (4) Date: Feb. 19, 2014

(87) PCT Pub. No.: WO2013/031338
PCT Pub. Date: Mar. 7, 2013

(65) Prior Publication Data
US 2014/0202409 A1    Jul. 24, 2014

(30) Foreign Application Priority Data
Aug. 29, 2011 (JP) .................................. 2011-186555

(51) Int. Cl.
*F01L 1/34* (2006.01)
*F01L 1/344* (2006.01)
(Continued)

(52) U.S. Cl.
CPC ........... *F01L 1/3442* (2013.01); *F15B 13/0402* (2013.01); *F16K 3/26* (2013.01);
(Continued)

(58) Field of Classification Search
CPC . F01L 1/3442; F01L 1/356; F01L 2001/3443; F01L 2001/34456; F01L 2001/34463; F16K 3/26; F16K 31/06; F15B 13/0402; F15B 2013/004

USPC ....................................................... 123/90.17
See application file for complete search history.

(56) References Cited

U.S. PATENT DOCUMENTS

| 7,720,650 B2 | 5/2010 | Gajewski |
| 2002/0100445 A1 | 8/2002 | Takenaka et al. |

(Continued)

FOREIGN PATENT DOCUMENTS

| EP | 2 059 656 A1 | 5/2009 |
| JP | 10-159519 A | 6/1998 |

(Continued)

OTHER PUBLICATIONS

International Search Report (PCT/ISA/210) mailed on Sep. 18, 2012, by the Japanese Patent Office as the International Searching Authority for International Application No. PCT/JP2012/065519.

(Continued)

*Primary Examiner* — Zelalem Eshete
(74) *Attorney, Agent, or Firm* — Buchanan Ingersoll & Rooney PC

(57) ABSTRACT

A valve opening-closing timing control device includes a solenoid valve having a solenoid mechanism provided with a spool having an oil path groove formed in an outer face thereof, and a sleeve for housing the spool to reciprocate and slide. A wall surface of the sleeve has a first port communicating with a first hydraulic oil supply section, a second port communicating with a second hydraulic oil supply section, and a third port communicating with the side of a hydraulic oil supply source. The spool is driven and set to a first position for supplying hydraulic oil from the hydraulic oil supply source to the first port, a second position for supplying the hydraulic oil from the hydraulic oil supply source to the second port, and a third position outside an area between the first and second positions to prevent supply of hydraulic oil from the first and second ports.

5 Claims, 6 Drawing Sheets

(51) Int. Cl.
 *F15B 13/04* (2006.01)
 *F16K 3/26* (2006.01)
 *F16K 31/06* (2006.01)
 *F15B 13/00* (2006.01)
(52) U.S. Cl.
 CPC ........ *F16K 31/06* (2013.01); *F01L 2001/3443* (2013.01); *F01L 2001/34456* (2013.01); *F01L 2001/34463* (2013.01); *F15B 2013/004* (2013.01); *Y10T 137/8671* (2015.04)

(56) References Cited

U.S. PATENT DOCUMENTS

| | | | |
|---|---|---|---|
| 2007/0251474 A1* | 11/2007 | Gauthier et al. | ........... 123/90.17 |
| 2008/0066572 A1 | 3/2008 | Takahashi et al. | |
| 2008/0092837 A1 | 4/2008 | Roth et al. | |
| 2010/0108004 A1 | 5/2010 | Lettmann et al. | |

FOREIGN PATENT DOCUMENTS

| | | | |
|---|---|---|---|
| JP | 2002-349220 A | 12/2002 | |
| JP | 2003-013716 A | 1/2003 | |
| JP | 2009-108743 A | 5/2009 | |
| JP | 2009-127580 A | 6/2009 | |
| JP | 2009-299585 A | 12/2009 | |
| JP | 2011-117317 A | 6/2011 | |
| WO | 2006/078935 A1 | 7/2006 | |

OTHER PUBLICATIONS

Written Opinion (PCT/ISA/237) mailed on Sep. 18, 2012, by the Japanese Patent Office as the International Searching Authority for International Application No. PCT/JP2012/065519.

Notification of Transmittal of Translation of the International Preliminary Report on Patentability (Forms PCT/IB/338 and PCT/IB/373) and the Written Opinion of the International Searching Authority (Form PCT/ISA/237) issued on Mar. 4, 2014, in the corresponding International Application No. PCT/JP2012/065519. (10 pages).

Office Action issued on May 15, 2014, by the Japanese Patent Office in corresponding Japanese Patent Application No. 2011-186555. (2 pages).

Office Action (Notification of the First Office Action) issued on Jul. 1, 2015, by the State Intellectual Property Office of People's Republic of China in corresponding Chinese Patent Application No. 201280041957.X, and an English Translation of the Office Action. (11 pages).

* cited by examiner

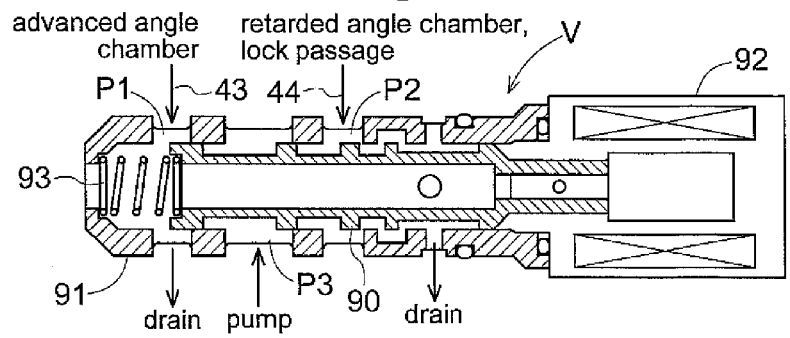
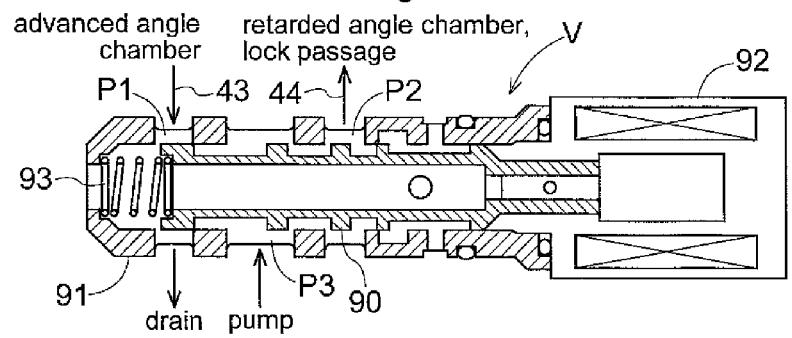
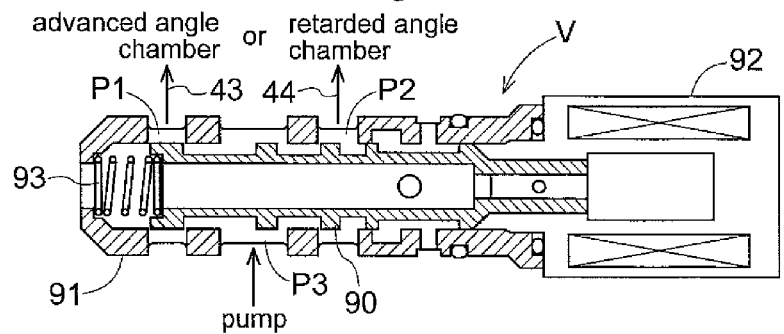
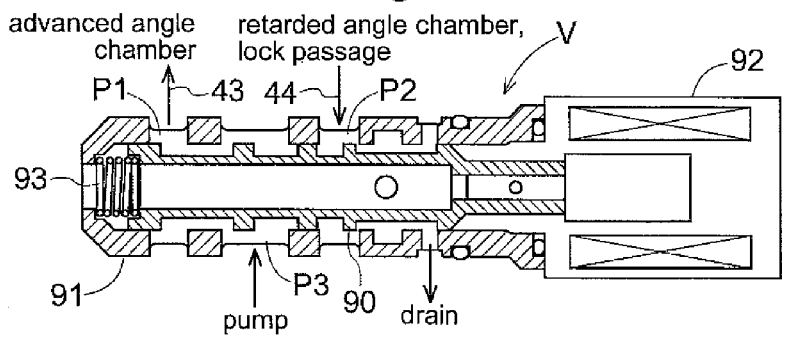

SOLENOID VALVE AND VALVE OPENING-CLOSING TIMING CONTROL DEVICE

TECHNICAL FILED

The present invention relates to a solenoid valve with a solenoid mechanism including a spool having an oil path groove formed in an outer face thereof, and a sleeve for housing the spool to reciprocate and slide, the sleeve having, in a wall surface thereof, a first port communicating with a first hydraulic oil supply section, a second port communicating with a second hydraulic oil supply section, and a third port communicating with the side of a hydraulic oil supply source, thereby to change the position of the spool.

The present invention further relates to a valve opening-closing timing control device including the solenoid valve.

BACKGROUND ART

An example of the conventional solenoid valve and valve opening-closing timing control device is shown in Japanese Unexamined Patent Application Publication No. 10-159519 (PTL 1).

The above conventional art relates to a valve opening-closing timing control device for changing and controlling the opening/closing timing for an intake or exhaust valve provided in a cylinder during operation of an internal combustion engine. Such a device includes a driving rotary element synchronously rotatable with a crankshaft, a driven rotary element disposed coaxially with and relatively rotatable with the driving rotary element to be rotatable in unison with a camshaft for opening and closing the intake or exhaust valve, and a lock element for engaging the driving rotary element with the driven rotary element to be rotatable in unison. The lock element can be released by hydraulic oil supplied to an advanced angle chamber or a retarded angle chamber formed between the driving rotary element and the driven rotary element when the internal combustion engine is started.

According to the conventional art, a pressure-discharging passage is provided for discharging pressure of one of the advanced angle chamber and the retarded angle chamber to which hydraulic pressure is applied first in order to prevent air mixed in oil from erroneously releasing the lock element before the hydraulic pressure starts to work sufficiently when the internal combustion engine is started.

As a result, even if air is mixed in oil before the hydraulic pressure starts to work sufficiently when the internal combustion engine is started, for example, the air is discharged through the pressure-discharging passage, thereby to avoid erroneous operation of the lock element for reliably preventing a vane from colliding with a wall of the advanced angle chamber or the retarded angle chamber and producing striking sound. Thus, according to the conventional arrangement, the pressure-discharging passage is provided in a side surface of the lock element for releasing the air. The pressure-discharging passage has a size for allowing only air to pass through the hydraulic chamber to the outside.

CITATION LIST

Patent Literature

PTL 1: Japanese Unexamined Patent Application Publication No. 10-159519

SUMMARY OF INVENTION

With the conventional arrangement described above, the pressure-discharging passage is configured to communicate with the outside when the lock element starts to move in a disengaging direction by air pressure. However, when a foreign matter is present in the vicinity of the pressure-discharging passage, for example, the pressure-discharge passage may be closed to hinder the air from releasing, as a result of which the lock element is inadvertently released.

Further, even if a foreign matter is absent, the pressure-discharging passage is narrow and thus accumulates dirt in operation. As a result, the pressure-discharging passage may be completely closed to prohibit the air from escaping constantly.

The object of the present invention is to solve the problems of the conventional art set forth above and to provide a valve opening-closing timing control device and a solenoid valve used with the device for reliably preventing erroneous operation of the lock element when the engine is started.

[Characteristic Feature]

A solenoid valve according to the present invention is provided with a solenoid mechanism including a spool having an oil path groove formed in an outer face thereof, and a sleeve for housing the spool to reciprocate and slide. The sleeve has, in a wall surface thereof, a first port communicating with a first hydraulic oil supply section, a second port communicating with a second hydraulic oil supply section, and a third port communicating with the side of a hydraulic oil supply source. The spool is driven and set to a first position for supplying hydraulic oil from the hydraulic oil supply source to the first port, a second position for supplying the hydraulic oil from the hydraulic oil supply source to the second port, and a third position defined at a position outside of an area between the first position and the second position to prevent the hydraulic oil from being supplied from the first port and the second port.

[Effect]

With the above arrangement, the establishment and the breakage of the communication between the third port acting as a supply port for the hydraulic oil and the first port and the second port for supplying the hydraulic oil to other sections can be clearly distinguished. Therefore, it is possible to reliably control the device for performing various operations by the hydraulic oil.

[Characteristic Feature]

A valve opening-closing timing control device according to the present invention includes a driving rotary element synchronously rotatable with a crankshaft of an internal combustion engine, a driven rotary element disposed coaxially with and relatively rotatable with the driving rotary element to be rotatable in unison with a camshaft for opening and closing a valve of the internal combustion engine, an advanced angle chamber and a retarded angle chamber formed by the driving rotary element and the driven rotary element, the advanced angle chamber being configured to move a relative rotational phase of the driven rotary element to the driving rotary element to an advanced angle direction by increasing the capacity of the chamber with the supply of the hydraulic oil, the retarded angle chamber being configured to move the relative rotational phase to a retarded angle direction by increasing the capacity of the chamber with the supply of the hydraulic oil, and a lock mechanism for locking the relative phase between the driving rotary element and the driven rotary element, the lock mechanism being releasable by the hydraulic oil supplied to the advanced angle chamber or the retarded angle chamber. The device further includes a solenoid mechanism including a spool having an oil path groove formed in an outer face thereof, and a sleeve for housing the spool to reciprocate and slide. The sleeve has, in a wall surface thereof, a first port communicating with the advanced angle chamber, a second port communicating with the retarded angle chamber, and a third port communicating with the side of a hydraulic oil pump. The spool is driven and set to a first position for supplying the hydraulic oil from the hydraulic oil pump to the first port, a second position for supplying the hydraulic oil from the hydraulic oil pump to the second port, and a third position defined at a position outside of an area between the first position and the second position to prevent the hydraulic oil from being supplied from the first port and the second port.

[Effect]

When the valve opening-closing timing is controlled to the advanced angle side or the retarded angle side in the internal combustion engine, it is generally required to switch between the advanced angle control and the regarded angle control quickly. As a result, the internal combustion engine can have good responsiveness and achieve an optimal combustion state. With the above arrangement, the third port is provided to space apart from a position for switching between the first port for the advanced angle control and the second port for the retarded angle control in order not to mar the responsiveness of the internal combustion engine.

Such a construction prevents the lock mechanism from erroneously operating when the engine is started in the valve opening-closing timing control device for performing operation of the lock mechanism along with the advance angle control or the retarded angle control. As a result, the internal combustion engine for enhancing the startability of the engine can be achieved.

[Characteristic Feature]

It is preferable in the valve opening-closing timing control device of the present invention that the sleeve is provided with a drain passage for opening at least the first port communicating with the advanced angle chamber when the spool is in the third position.

[Effect]

Normally, the valve opening-closing timing control device includes the lock mechanism for locking the relative position between the driving rotary element and the driven rotary element in order to facilitate the subsequent start of the engine. The lock mechanism is configured to lock the relative position to a lock phase by supplying the hydraulic oil to the advanced angle chamber and the retarded angle chamber as necessary when the engine stops. However, in some cases, the locking operation is not completed, and the relative position may not be locked in the lock phase.

In such a case, the driving rotary element and the driving rotary element are relatively rotated in starting the engine to lock them to the lock position, and then the engine is started. In most cases, the driven rotary element is positioned in the retarded angle side. More particularly, when the rotary elements fail to be locked in the lock phase when the engine stops, it is preferable in most cases to relatively rotate the driven rotary element to the retarded angle side when the engine is started.

With the above-described arrangement, the valve opening-closing timing control device allows the driven rotary element to easily move toward the retarded angle side, that is, to the side for reducing the capacity of the advanced angle chamber by draining the first port communicating with the advanced angle chamber when the engine is started, thereby to enhance the startability of the engine.

[Characteristic Feature]

Further, according to the valve opening-closing timing control device of the present invention, the sleeve may be provided with a drain passage for opening the first port communicating with the advanced angle chamber or the second port communicating with the retarded angle chamber when the spool is in the third position.

[Effect]

When both the advanced angle chamber and the retarded angle chamber are drained when the engine is started as in the above-described arrangement, the startability of the engine having an intermediate lock mechanism, in particular, can be enhanced. In performing the intermediate locking, the driven rotary element is in a position between a most retarded angle position and a most advanced angle position. Thus, if the locking operation is unsuccessful when the engine stops, it is highly likely that the relative position of the driven rotary element may be in the advanced angle side or the retarded angle side relative to the lock position. In such a case, both the advanced angle chamber and the retarded angle chamber are drained to allow the driven rotary element to easily move to both the advanced angle direction and the retarded angle direction when hydraulic pressure is not sufficiently increased in time of the start of the engine. As a result, the probability that the driven rotary element will be locked in the intermediate lock position is increased, thereby to enhance the startability of the engine.

[Characteristic Feature]

According to the valve opening-closing timing control device of the present invention, the solenoid mechanism is configured to bring the spool to the third position even when the internal combustion engine is stopped.

[Effect]

With the valve opening-closing timing control device including the lock mechanism, it is desirable to reliably maintain the driven rotary element to the lock position when the engine stops. To this end, it is required to drain the hydraulic oil in the lock passage quickly. According to the device having the above-described arrangement, the supply of the hydraulic oil to the retarded angle passage is stopped by stopping the engine. As a result, the hydraulic oil in the retarded angle passage and the lock mechanism starts to decrease, thereby to allow the lock mechanism to function quickly.

[Characteristic Feature]

Further, a valve opening-closing timing control device according to the present invention may include a driving rotary element synchronously rotatable with a crankshaft of an internal combustion engine, a driven rotary element disposed coaxially with and relatively rotatable with the driving rotary element to be rotatable in unison with a camshaft for opening and closing a valve of the internal combustion engine, an advanced angle chamber and a retarded angle chamber formed by the driving rotary element and the driven rotary element, the advanced angle chamber being configured to move a relative rotational phase of the driven rotary element to the driving rotary element to an advanced angle direction by increasing the capacity of the chamber with the supply of the hydraulic oil, the retarded angle chamber being configured to move the relative rotational phase to a retarded angle direction by increasing the capacity of the chamber with the supply of the hydraulic oil, a lock mechanism for locking the relative phase between the driving rotary element and the driven rotary element, the lock mechanism being releasable by the hydraulic oil supplied to at least either one of the advanced angle chamber and the retarded angle chamber, and a solenoid mechanism. The solenoid mechanism includes a spool having an oil path groove formed in an outer face thereof, and a sleeve for housing the spool to reciprocate and slide. The sleeve has, in a wall surface thereof, a first port communicating with the advanced angle chamber, a second port communicating with the retarded angle chamber, and a third port communicating with the side of a hydraulic oil pump. The spool is driven to a first position for supplying the hydraulic oil from the hydraulic oil pump to the first port, a second position for supplying the hydraulic oil from the hydraulic oil pump to the second port, and a third position different from the first position and the second position to provide an insensible range in which the hydraulic oil is not supplied from the first port and the second port.

[Effect]

With the above-described arrangement, the spool may be positioned in the insensible range to prevent the hydraulic oil supplied to the third port from being supplied from the first port and the second port, thereby to improve the shutoff properties of the hydraulic oil. In this case, the third position may be between the first position and the second position. This position primarily represents a switching position between the advanced angle control and the retarded angle control, and thus quick switching for the control is required. Although a wide insensible range is secured to mar the responsiveness for the advanced angle control or the retarded angle control to some extent, the above-described arrangement may be provided if any advantage is obtained in a working condition by extending the shutoff period for the hydraulic oil.

It is preferable for the solenoid valve or the valve opening-closing timing control device of the present invention that the solenoid mechanism is an electromagnetic valve that is driven by electric power supply, and the spool is brought to the third position in a non-electrified state.

When the solenoid mechanism is not electrified, the spool is in the third position in which the hydraulic oil is not supplied to the first port and the second port as in the above arrangement. This restrains the hydraulic oil that has already been supplied from being discharged to the hydraulic oil supply source through the solenoid mechanism by bringing the solenoid mechanism into the non-electrified state.

BRIEF DESCRIPTION OF DRAWINGS

FIG. 4 is an illustrative view for an operation of a solenoid valve according to the first embodiment;

FIG. 5 is an illustrative view for an operation of the solenoid valve according to the first embodiment;

FIG. 6 is an illustrative view for an operation of the solenoid valve according to the first embodiment;

FIG. 7 is an illustrative view for an operation of the solenoid valve according to the first embodiment;

DESCRIPTION OF EMBODIMENTS

Embodiments of a solenoid valve according to the present invention applied to an automobile engine that is an example of an internal combustion engine will be described hereinafter in reference to FIGS. 1 to 9.

[Basic Construction of Valve Opening-Closing Timing Control Device]

Figure 1:
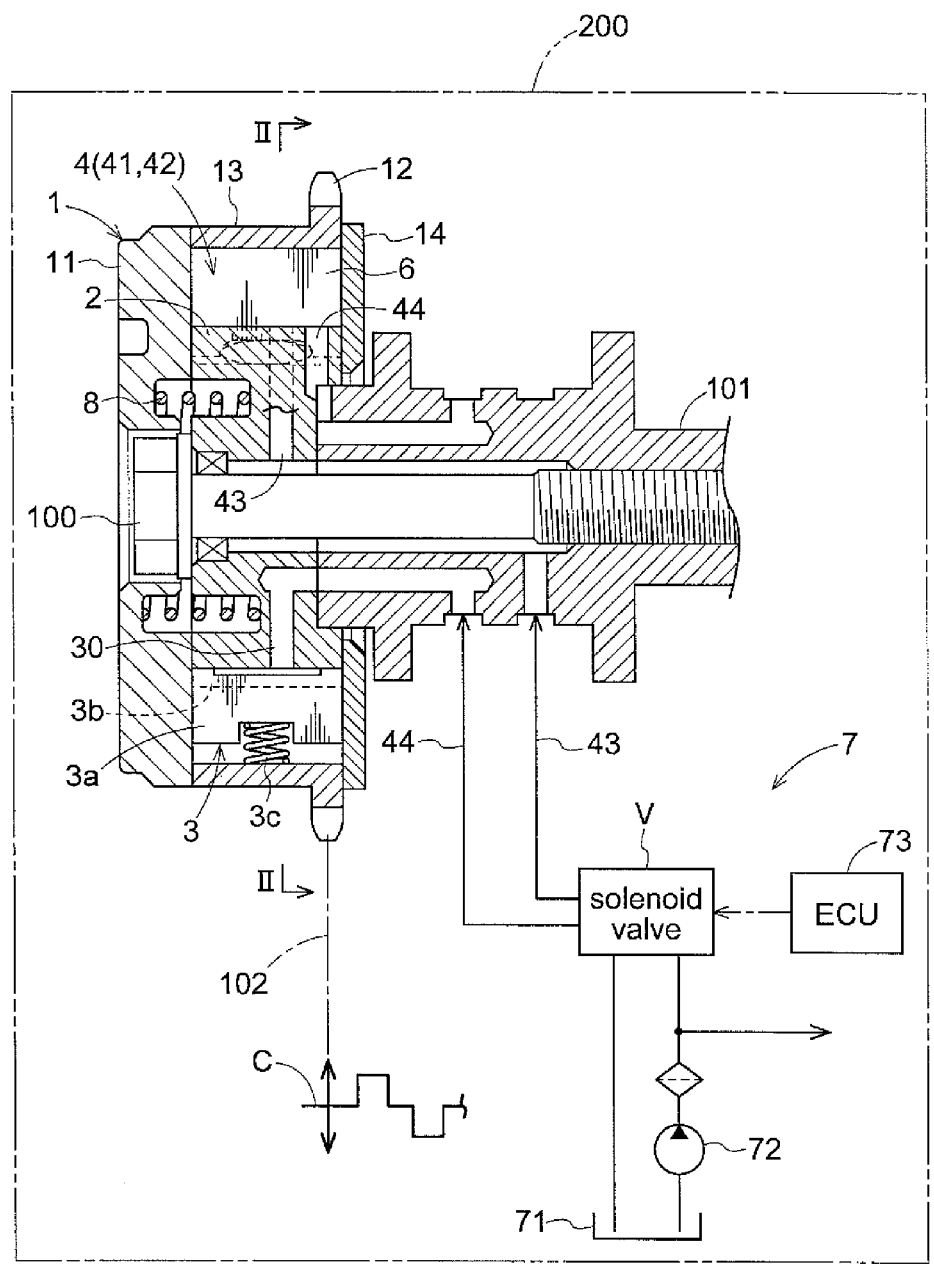
FIG. 1 is an illustrative view of a valve opening-closing timing control device according to a first embodiment.

Referring to FIG. 1, a valve opening-closing timing control device includes a housing 1 acting as a "driving rotary element" that is synchronously rotatable with a crankshaft C of an engine 200, and an inner rotor 2 disposed coaxially with the housing 1 and acting as a "driven rotary element" that is synchronously rotatable with a camshaft 101. The camshaft 101 is a rotary shaft of an unillustrated cam for controlling opening and closing a valve body of the engine 200. The camshaft 101 is rotatably assembled to a cylinder head (not shown) of the engine 200.

Figure 2:
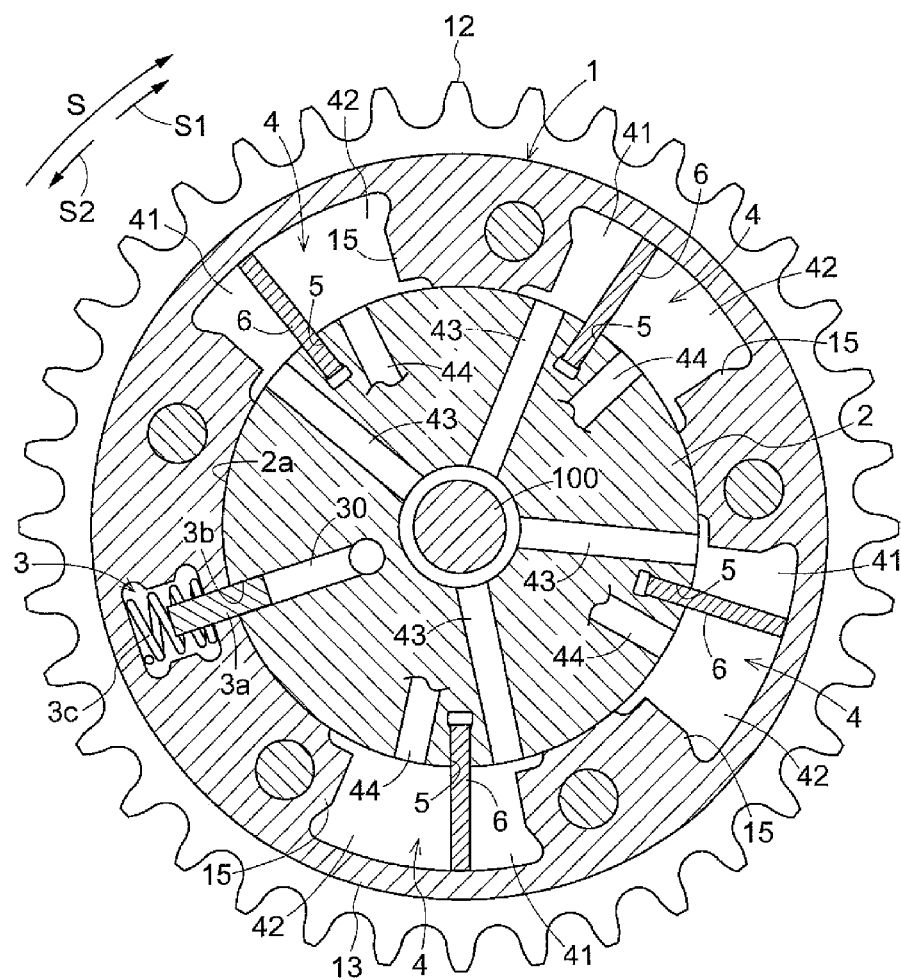
FIG. 2 is an illustrative view of a driving rotary element and a driven rotary element in a locked state.
Figure 3:
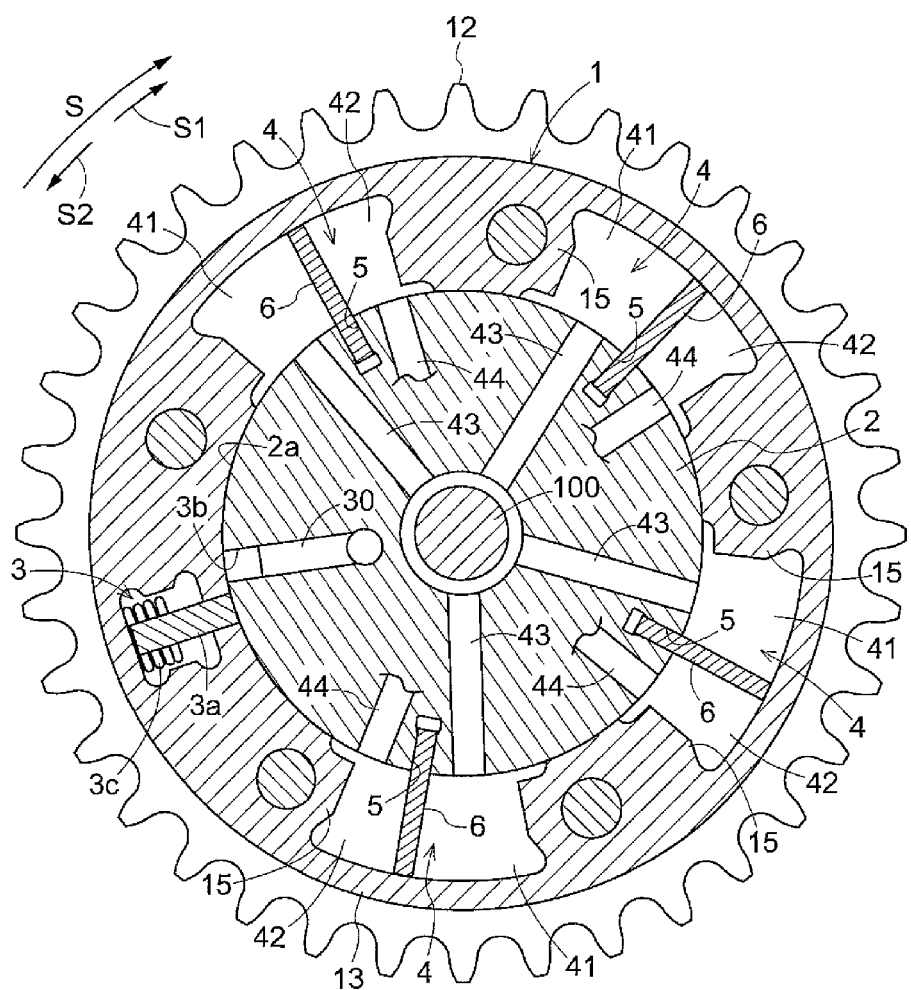
FIG. 3 is an illustrative view of a driving rotary element and a driven rotary element in an unlocked state.

The valve opening-closing timing control device further includes a lock mechanism 3 for restricting relative rotational movement of the inner rotor 2 relative to the housing 1, thereby to restrict a relative rotational phase of the inner rotor 2 relative to the housing 1 to a predetermined phase between a most retarded angle phase and a most advanced angle phase. As shown in FIGS. 2 and 3, the lock mechanism 3 includes a lock element 3a projectable from and retractable to the housing 1 in a radially inward direction, and a lock groove 3b formed in the inner rotor 2 to be engageable with the lock element 3a, for example.

The inner rotor 2 is integrally assembled to a distal end of the camshaft 101 through a bolt 100 as shown in FIG. 1. The housing 1 includes a front plate 11 positioned on a side opposite to a side where the camshaft 101 is connected, an outer rotor 13 integrally formed with a timing sprocket 12, and a rear plate 14 on the side where the camshaft 101 is connected.

When the crankshaft C is rotated, a rotational driving force is transmitted to the timing sprocket 12 through a power transmission element 102, thereby to rotate the housing 1 in a rotational direction S shown in FIG. 2. With the rotation of the housing 1, the inner rotor 2 is rotated in the rotational direction S to rotate the camshaft 101. Then, the cam mounted on the camshaft 101 presses down the valve body of the engine 200 to open the valve.

Referring to FIG. 2, a fluid pressure chamber 4 is formed of the outer rotor 13 and the inner rotor 2. The outer rotor 13 has a plurality of projections 15 protruding radially inward and spaced apart from each other along the rotational direction S. The projections 15 act as shoes against an outer circumferential surface 2a of the inner rotor 2.

A vane groove 5 is formed in a portion of the outer circumferential surface 2a facing the fluid pressure chamber 4. A vane 6 is provided in the vane groove 5 to direct radially outward. The fluid pressure chamber 4 is divided into an advanced angle chamber 41 and a retarded angle chamber 42 by the vane 6 along the rotational direction S.

Referring to FIGS. 1 and 2, an advanced angle passage 43 is formed in the inner rotor 2 and the camshaft 101. The advanced angle passage 43 communicates with each advanced angle chamber 41. Similarly, a retarded angle passage 44 is formed in the inner rotor 2 and the camshaft 101. The retarded angle passage 44 communicates with each retarded angle chamber 42. As shown in FIG. 1, the advanced angle passage 43 and the retarded angle passage 44 are connected to a hydraulic oil supply/discharge mechanism 7 described in detail later.

Hydraulic oil is supplied to, discharged from, or retained in the advanced angle chamber 41 and the retarded angle chamber 42 through the hydraulic oil supply/discharge mechanism 7, thereby to exert fluid pressure of the hydraulic oil on the vane 6. The relative rotational phase is displaced in an advanced angle direction or a retarded angle direction, or is maintained in a desirable phase in this manner. Here, the advanced angle direction represents a direction to increase the capacity of the advanced angle chamber 41 and is shown in an arrow S1 in FIG. 2. The retarded angle direction represents a direction to increase the capacity of the retarded angle chamber 42 and is shown in an arrow S2 in FIG. 2. Further, the most retarded angle phase represents a phase in which the capacity of the retarded angle chamber 42 becomes maximum while the most advanced angle phase represents a phase in which the capacity of the advanced angle chamber 41 becomes maximum.

[Lock Mechanism]

The lock mechanism 3 is configured to maintain the housing 1 and the inner rotor 2 in a predetermined relative position under a condition where the pressure of the hydraulic oil is not stabled when the engine 200 is started. The relative position represents the predetermined phase between the most retarded angle phase and the most advanced angle phase, and is suitable for starting the engine 200. Such a relative position will be referred to as an "intermediate lock phase" hereinafter. The intermediate lock phase maintains the rotational phase of the camshaft 101 relative to the rotational phase of the crankshaft C properly and produces stable rotation of the engine 200.

Referring to FIGS. 2 and 3, the lock mechanism 3 includes the lock element 3*a*, a spring 3*c* for urging the lock element 3*a* radially inward, and the lock groove 3*b* engageable with the lock element 3*a*.

A lock passage 30 communicates with the lock groove 3*b* for supplying the hydraulic oil. The lock passage 30 is formed in the inner rotor 2 and the camshaft 101, and communicates with the retarded angle passage 44 described later in detail. The lock passage is configured to control the solenoid valve described later in detail, thereby to control an advanced angle or a retarded angle as well as projecting/retracting movement of the lock element 3*a*.

[Torsion Spring]

The engine 200 is normally in an idling state when the engine stops. In most cases, the relative rotational phase in the idling state is in the vicinity of the most retarded angle phase. This phase is in the retarded angle side relative to a lock phase. Thus, in order to establish the lock phase smoothly when the engine stops, it is required to rotate the inner rotor 2 toward the advanced angle side when the supply of the hydraulic oil is stopped.

In this, as shown in FIG. 1, a torsion spring 8 is provided between the inner rotor 2 and the front plate 11. The torsion spring 8 acts on the housing 1 and the inner rotor 2 to bring the relative rotational phase into the most advanced angle phase.

[Hydraulic Oil Supply/Discharge Mechanism]

Referring to FIG. 1, the hydraulic oil supply/discharge mechanism 7 includes an oil pan (hydraulic oil supply source) 71 for reserving the hydraulic oil, an oil pump 72 driven by the engine 200 for supplying the hydraulic oil, and a solenoid valve V of the electromagnetic control type for controlling the supply, discharge and retention of the hydraulic oil relative to the advanced angle passage 43 and the retarded angle passage 44. The solenoid valve V is controlled by an ECU 73.

Referring to FIGS. 4 to 7, the solenoid valve V includes a spool 90 that reciprocates and slides in one direction, and a sleeve 91 for housing the spool 90 to reciprocate and slide.

The spool 90 has a plurality of oil path grooves formed in an outer surface thereof. The sleeve 91 has a first port P1 for allowing the hydraulic oil to communicate with the advanced angle chamber 41 acting as a first hydraulic oil supply section, a second port P2 for allowing the hydraulic oil to communicate with the retarded angle chamber 42 acting as a second hydraulic oil supply section and to the lock passage 30, and a third port P3 for allowing the hydraulic oil to communicate with the side of the hydraulic oil supply source, those of which are formed in a wall surface of the sleeve 91.

The spool 90 is reciprocated by a solenoid mechanism 92. The spool 90 can be set to a first position in which the hydraulic oil from the oil supply source is supplied to the first port P1, a second position in which the hydraulic oil is supplied to the second port P2, and a third position in which the hydraulic oil is supplied neither from the first port P1 nor from the second port P2. According to an example shown in FIGS. 4 to 7, the third position is defined at a position outside of an area between the first position and the second position, e.g., adjacent to the solenoid mechanism 92. The solenoid mechanism 92 is electrified to move the spool to the left side in FIGS. 4 to 7. When the electric power supply is cut off, the spool 90 is urged toward the third position by the action of a return spring 93 provided between an end portion of the spool 90 and an inner surface of the sleeve 91.

FIG. 4 shows a state in which the spool 90 is in the third position. In this state, the spool 90 is positioned at the rightmost side in FIG. 4, in which the third port P3 for supplying the hydraulic oil communicates with neither the first port P1 nor the second port P2. On the other hand, the first port P1 and the second port P2 communicate with unillustrated drain passages, respectively.

Since the spool 90 is located in the third position during a non-electrified state, the hydraulic oil is not supplied to the first port P1 and the second port P2. This prevents the hydraulic oil that has been supplied from being discharged to the oil pan 71 through the solenoid mechanism 92 by cutting off the electric power supply.

FIG. 5 shows a state in which the spool 90 is in the second position. In this state, the third port P3 communicates with the second port P2. The first port P1 communicates with the drain passage.

FIG. 7 shows a state in which the spool 90 is in the first position. In this state, the third port P3 communicates with the first port P1. The second port P2 communicates with the drain passage.

FIG. 6 shows a state in which the spool 90 is in an intermediate position between the first position and the second position. In this state, the third port P3 communicates with neither the first port P1 nor the second port P2. However, when the spool 91 is moved even slightly to the right or the left, the third port P3 communicates with the first port P1 or the second port P2. This state is represented by a state in which the phase of the VVT is maintained in a fixed position when the engine 200 is operating, for example. The spool 90 is slightly reciprocated by the solenoid mechanism 92, in which the hydraulic oil is supplied to the advanced angle chamber and the retarded angle chamber alternately.

In order to achieve the above-described state reliably, the third position is determined at one end of a working range of the spool 90 as shown in FIG. 4. The pressure of the hydraulic oil is insufficient until the engine is started to actuate the oil pump 72. Since it is difficult to maintain the position of the spool 90 in such a state, the spool 90 is pressed to one side using the return spring 93. This stabilizes the position of the spool 90 when the engine is started and prevents the hydraulic oil or air from being supplied to the lock passage 30 to avoid erroneous operation of the lock element 3*a* and enhance the startability of the engine 200.

The above-described embodiment is not limitative, and thus it is not impossible to set the third position of the spool 90 to the position shown in FIG. 6. In order to bring the spool 90 exactly to that position, however, it is required to exactly grasp the viscosity of the hydraulic oil present in the sleeve 91 and the urging force of the return spring 93. Since the viscosity of the hydraulic oil varies depending on the temperature, the position of the spool 90 may not be constant even if the solenoid mechanism 92 is operated in the same manner at all times. In this, an insensible range in which the spool 90 communicates with neither the first port P1 nor the second port P2 is widened, thereby to improve the shutoff properties of the hydraulic oil. When the insensible range is broadened, the responsiveness of the advanced angle and retarded angle control when the engine 200 is in the normal operative condition is lowered to some extent. However, the above effect can be achieved by taking the operating conditions of both control operations into account.

The operation of the solenoid valve V will be specifically described hereinafter in reference to FIGS. 8 and 9.

Figure 8:
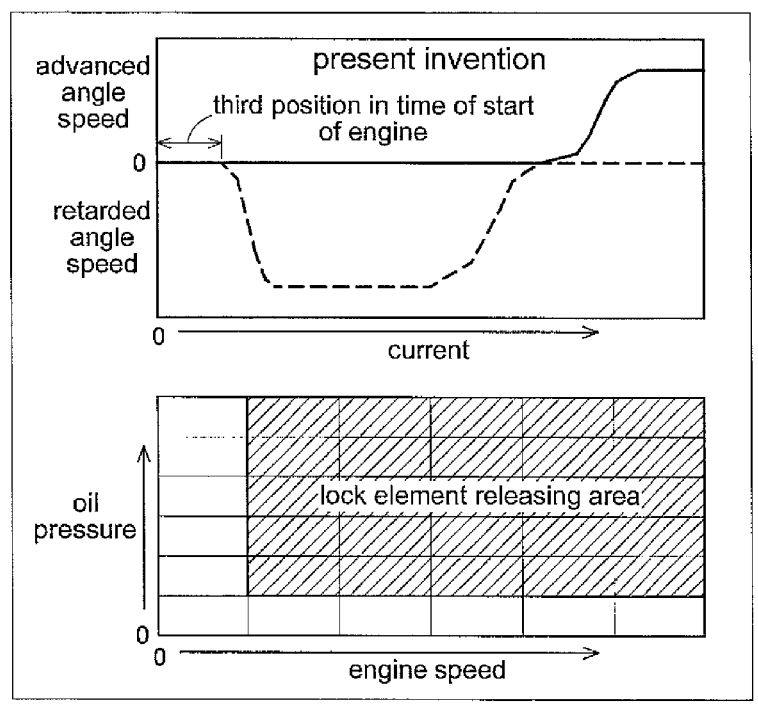
FIG. 8 is a graphic representation for an operation of the solenoid valve.
Figure 9:
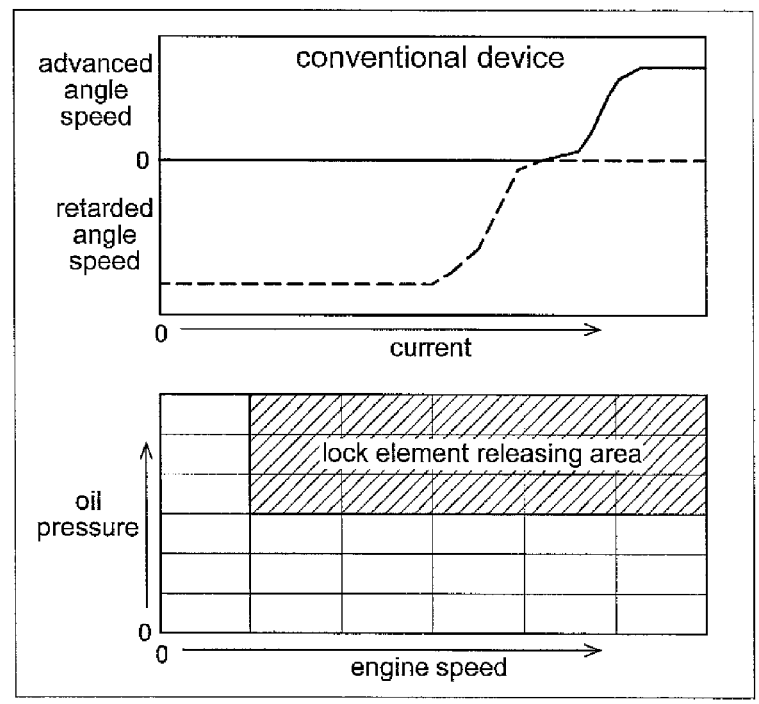
FIG. 9 is a graphic representation for an operation of the solenoid valve.

FIG. 8 is a graphic representation showing the movement of the spool 90 in the present invention, and FIG. 9 is a graphic representation showing the movement of the spool 90 of the conventional OCV. In this, the electrified condition of the solenoid valve V is different between the present invention and the conventional art. With the conventional valve, as shown in the upper graph of FIG. 9, the solenoid mechanism 92 starts to be electrified to execute the control to the retarded angle side upon the start of the engine 200. As a result, air is supplied to the lock passage 30, which may cause the lock element 3a to be released erroneously. According to the conventional art, in order to decrease such a possibility of the erroneous release, the spring force of the lock element 3a is set to be powerful. Therefore, high hydraulic pressure is required to release the lock element 3a as shown in the lower graph of FIG. 9.

In contrast, according to the solenoid valve V of the present invention, the current value is zero when the engine 200 is started as shown in the upper graph of FIG. 8. Therefore, the engine 200 is started with the spool 90 being retained in the third position to maintain the lock phase. When the engine 200 is started to work the hydraulic pressure of the oil pump 72, the solenoid valve V starts to be electrified to execute the control to the retarded angle side, thereby to release the lock element 3a.

As a result, the spring force of the lock element 3a can be set to be small as shown in the lower graph of FIG. 8. When the force of the spring 3c is diminished, the unlocking operation is quickly performed to improve the operability of the device. Further, when the force of the spring 3a is diminished, the pressure of the hydraulic oil always excels the force of the spring 3c after the lock element 3a is released, which gives no chance for the lock element 3a to erroneously re-engage the lock groove 3b. Thus, the lock element 3a is not inadvertently engaged during the change of the phase of the inner rotor 2, thereby to stabilize the operation of the device.

The solenoid valve V of the present invention ensures the unlocking operation especially when the engine is started. However, the solenoid valve V of the present invention works effectively even when the engine stops.

Since it is desired that the driven rotary element be reliably maintained in the lock position when the engine stops, the hydraulic oil in the lock passage 30 needs to be drained quickly. With the solenoid valve V of the present invention, at least the supply of the hydraulic oil to the retarded angle passage 44 is stopped by turning off an engine key. In this time, the retarded angle passage 44 and the advanced angle passage 45 are drained from the second port P2 and the first port P1, respectively, and thus the lock element 3a can be engaged with the lock groove 3b quickly. Since the retarded angle passage 44 and the advanced angle passage 43 are drained, the inner rotor 2 is easily rotatable relative to the outer rotor 13, and the inner rotor 2 and the outer rotor 13 repeat the relative movement to the advanced angle direction and to the retarded angle direction by the reaction of the cam torque, for example, which brings the rotors to the lock phase more easily.

[Second Embodiment]

Figure 10:
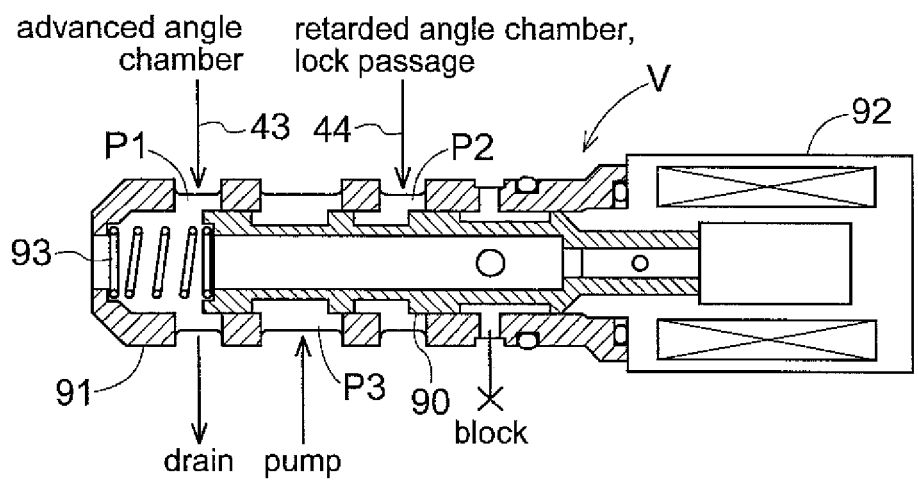
FIG. 10 is an illustrative view of the solenoid valve according to a second embodiment.

A second embodiment according to the present invention is shown in FIG. 10.

The second embodiment differs from the first embodiment in that the advanced angle chamber 41 is drained through the first port P1 and the retarded angle chamber 42 is not drained through the second port P2 when the spool 90 is in the rightmost third position.

With such an arrangement, air or the like is not supplied to the lock passage 30 through the retarded angle passage 44 when the engine is started, which prevents the erroneous release of the lock element 3a.

On the other hand, when the lock element 3a is not locked when the engine stops and the engine is started subsequently in such a state, the advanced angle chamber 41 is drained through the first port P1 and the retarded angle chamber 42 is not drained but is simply blocked. Thus, the inner rotor 2 is easily moved toward the retarded angle side by the reaction torque of the cam. Therefore, when the lock position is set to the most retarded angle side, it approaches the lock phase upon the start of the engine, which can enhance the startability of the engine 200.

[Third Embodiment]

Figure 11:
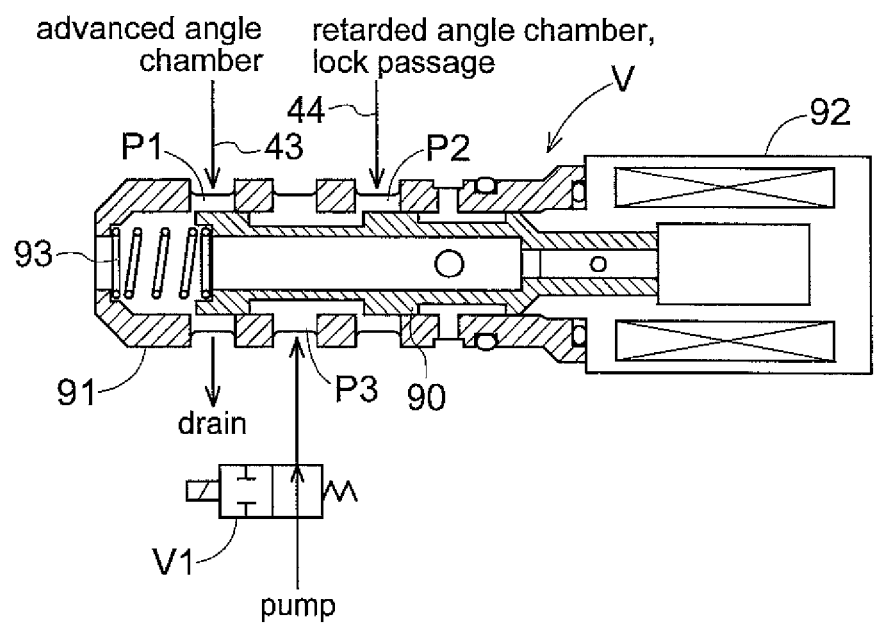
FIG. 11 is an illustrative view of the solenoid valve according to a third embodiment.

Referring to FIG. 11, a separate valve V1 may be provided between the oil pump 72 and the solenoid valve V.

In such a case, similarly to the conventional device, the spool 90 and the sleeve 91 are configured to allow the third port P3 to communicate with the second port P2 when the engine is started. However, the same effect in the above-described embodiments can be achieved by shutting off the supply of the hydraulic oil from the oil pump 72 to the solenoid valve V.

[Other Embodiments]

In the first to third embodiments, the lock passage 30 communicates with the retarded angle passage 44. Instead, the lock passage 30 may communicate with the advanced angle passage 43.

Further, the lock passage 30 may communicate with both the advanced angle passage 43 and the retarded angle passage 44. In that case, the lock element 3a may have a stepped shape so as to have two pressure-receiving faces. While one of the pressure-receiving faces acts as a pressure-receiving face for the hydraulic oil from the lock passage communicating with the advanced angle passage 43, the other of the pressure-receiving faces acts as a pressure-receiving face for the hydraulic oil from the lock passage communicating with the retarded angle passage 44.

Industrial Applicability

The solenoid valve and the device according to the present invention may be used in an intake-side valve opening-closing timing control device and a exhaust-side valve opening-closing timing control device provided in an internal combustion engine.

The invention claimed is:

1. A solenoid valve with a solenoid mechanism comprising:
a spool having an oil path groove formed in an outer face thereof; and
a sleeve housing the spool to allow the spool to reciprocate and slide, the sleeve having, in a wall surface thereof, a first port communicating with a first hydraulic oil supply section, a second port communicating with a second hydraulic oil supply section, and a third port communicating with the side of a hydraulic oil supply source, wherein the spool is driven and set to a first position for supplying hydraulic oil from the hydraulic oil supply source to the first port, a second position for supplying the hydraulic oil from the hydraulic oil supply source to the second port, and a third position defined at a position outside of an area between the first position and the second position to prevent the hydraulic oil from being supplied from the first port and the second port, wherein the solenoid mechanism is an electromagnetic valve that is driven by electric power supply, and the spool is brought to the third position in a non-electrified state of the electromagnetic valve, and wherein the sleeve includes drain passages for releasing hydraulic oil from the first port communicating with the first hydraulic oil supply section and the second port communicating with the second hydraulic oil supply section when the spool is in the third position.

2. A valve opening-closing timing control device comprising:

a driving rotary element synchronously rotatable with a crankshaft of an internal combustion engine;

a driven rotary element disposed coaxially with and relatively rotatable with the driving rotary element to be rotatable in unison with a camshaft for opening and closing a valve of the internal combustion engine;

an advanced angle chamber and a retarded angle chamber formed by the driving rotary element and the driven rotary element, the advanced angle chamber being configured to move a relative rotational phase of the driven rotary element to the driving rotary element to an advanced angle direction by increasing the capacity of the chamber with the supply of hydraulic oil, the retarded angle chamber being configured to move the relative rotational phase to a retarded angle direction by increasing the capacity of the chamber with the supply of the hydraulic oil;

a lock mechanism for locking the relative phase between the driving rotary element and the driven rotary element, the lock mechanism being releasable by the hydraulic oil supplied to at least either one of the advanced angle chamber and the retarded angle chamber; and a solenoid mechanism including a spool having an oil path groove formed in an outer face thereof; and a sleeve housing the spool to allow the spool to reciprocate and slide, the sleeve having, in a wall surface thereof, a first port communicating with the advanced angle chamber, a second port communicating with the retarded angle chamber, and a third port communicating with the side of a hydraulic oil pump, wherein the spool is driven to a first position for supplying the hydraulic oil from the hydraulic oil pump to the first port, a second position for supplying the hydraulic oil from the hydraulic oil pump to the second port, and a third position different from the first position and the second position to provide an insensible range in which the hydraulic oil is not supplied from the first port and the second port, wherein the sleeve includes drain passages for releasing hydraulic oil from the first port communicating with the advanced angle chamber and the second port communicating with the retarded angle chamber when the spool is in the third position.

3. The valve opening-closing timing control device according to claim 2, wherein the solenoid mechanism is an electromagnetic valve that is driven by electric power supply, and the spool is brought to the third position in a non-electrified state.

4. A solenoid valve with a solenoid mechanism comprising:

a spool having an outer face forming an oil path groove;

a sleeve housing the spool to allow the spool to axially reciprocate and slide in the sleeve, the sleeve including a wall surface which possesses a first port communicating with an advanced angle chamber, a second port communicating with a retarded angle chamber, and a third port communicating with the side of a hydraulic oil supply source;

a spring applying a biasing force to the spool in a direction toward the solenoid;

the solenoid mechanism being driven by electric power to axially move the spool away from the solenoid mechanism in an electrified state of the solenoid mechanism, the spring being configured to axially move the spool toward the solenoid mechanism in a non-electrified state of the solenoid mechanism;

the solenoid mechanism being configured, in the electrified state of the solenoid mechanism, to axially move the spool away from the solenoid mechanism to a first position in which the spool allows supply of hydraulic oil from the hydraulic oil supply source to the first port;

the solenoid mechanism being configured, in the electrified state of the solenoid mechanism, to axially move the spool away from the solenoid mechanism to a second position in which the spool allows supply of the hydraulic oil from the hydraulic oil supply source to the second port;

the spring being configured, in the non-electrified state of the solenoid mechanism, to axially move the spool towards the solenoid mechanism to a third position preventing the hydraulic oil from being supplied to the first port and to the second port; and the second position of the spool being located axially between the first position and the third position.

5. The solenoid valve according to claim 4, wherein the spool is biased by only a single spring.

* * * * *